April 14, 1931.  J. R. HENKLE  1,800,939
PORTABLE JACK
Original Filed May 16, 1927   2 Sheets-Sheet 2
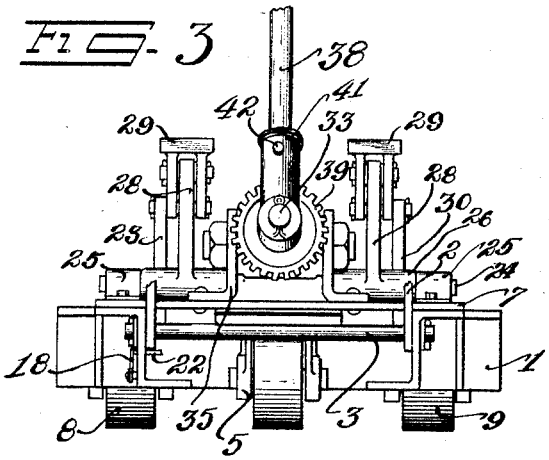
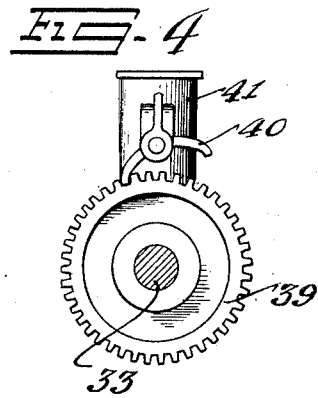
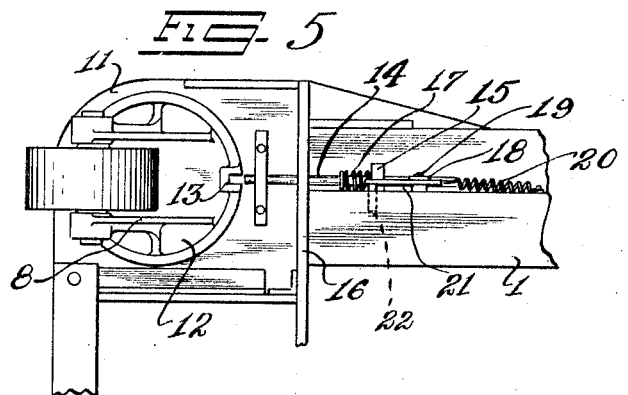
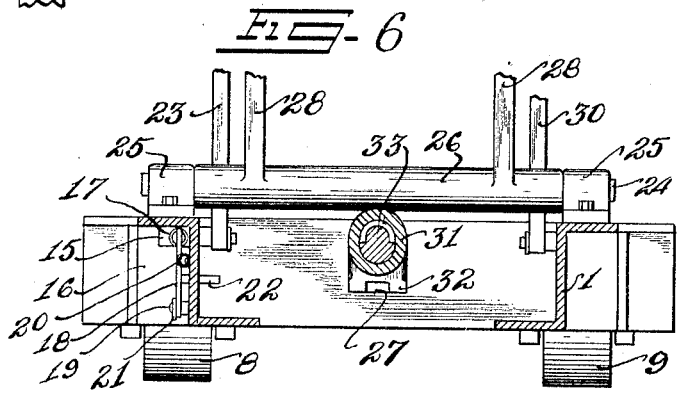
Inventor
John R. Henkle
by Charles... Att'ys Patented Apr. 14, 1931

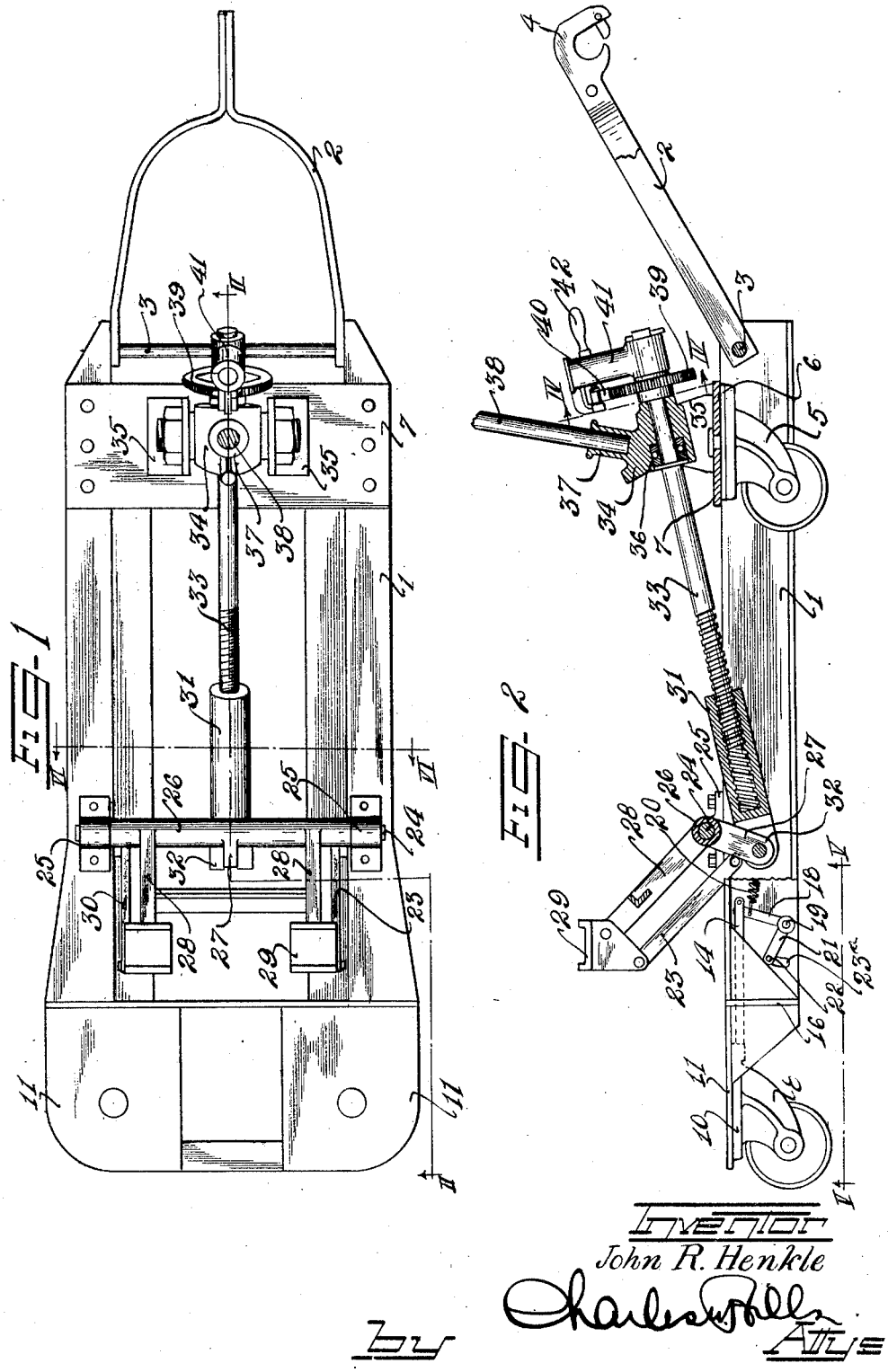

1,800,939

UNITED STATES PATENT OFFICE

JOHN R. HENKLE, OF CHICAGO, ILLINOIS, ASSIGNOR TO MERCURY MANUFACTURING COMPANY, OF CHICAGO, ILLINOIS, A CORPORATION OF ILLINOIS

PORTABLE JACK

Original application filed May 16, 1927, Serial No. 191,687, Patent No. 1,740,299, dated December 17, 1929. Divided and this application filed April 12, 1928. Serial No. 269,323.

This case is a division of my copending application for patent for a "portable jack" filed May 16th, 1927, Serial No. 191,687 (Patented Dec. 17, 1929, as Patent No. 1,740,299), and relates more particularly to pushing and pulling implements.

The present invention relates to a portable trailer jack adapted to be removably engaged beneath the front or rear axle of a vehicle to elevate one end of the vehicle, thereby permitting the trailer jack to be pulled over the ground by means of a motor truck or other suitable means to move the vehicle from one place to another.

It is an object of this invention to provide a portable trailer jack of substantial construction provided with suitable screw operated means for jacking up one end of a vehicle and, furthermore, being provided with rollers permitting the jack mechanism to be used as a portable support for one end of a vehicle to permit the vehicle to be transported from one place to another.

It is also an object of this invention to provide a portable jack of the trailer type having a pivoted jack mechanism adapted to be operated by means of telescoping screw members operable by means of a rotatable crank.

It is an important object of this invention to provide a portable jack embracing a metal frame supported on casters, said metal frame having a crank or lever operated jacking device pivotally mounted thereon and connected by telescoping screw members with the crank or lever mechanism.

Other and further important objects of this invention will be apparent from the disclosures in the specification and the accompanying drawings.

This invention (in a preferred form) is illustrated in the drawings and hereinafter more fully described.

On the drawings:

Figure 1 is a top plan view of a portable jack embodying the principles of this invention.

Figure 2 is a longitudinal section taken on line II—II of Figure 1, with parts shown in elevation.

Figure 3 is a front elevation of the portable truck with the bail and the lever broken away.

Figure 4 is an enlarged detail view taken on line IV—IV of Figure 2.

Figure 5 is a fragmentary bottom plan view of one of the rear corners of the portable jack taken on line V—V of Figure 2.

Figure 6 is a fragmentary transverse section taken on line VI—VI of Figure 1.

As shown on the drawings:

The reference numeral 1 indicates a heavy metal chassis or frame on the front end of which a draw yoke or bail 2 is pivotally mounted by means of a cross rod or shaft 3. The bail 2 is provided with a suitable latch head mechanism 4 to permit the same to be removably engaged in a pulling ring secured to a motor truck or the like.

The jack frame 1 is provided with a rotatable roller caster 5 having a ball bearing 6 positioned between the caster bracket and a transverse front top plate 7 forming a part of the jack framework. The front caster 5 is positioned under the middle front portion of the frame 1. Pivotally supported under the rear corners of the framework 1 are rear rotatable casters 8 and 9, each of which is provided with a ball bearing 10 positioned between the caster bracket and the rear corner plates 11 forming part of the framework 1.

The circular top plate 12 of the rear caster 8 is provided with a pair of diametrically opposite notches 13 positioned substantially in the middle plane of the roller of the caster 8. The notches 13 are provided in the caster 8 for the purpose of locking the same against rotation with respect to the framework 1, so that the portable jack may be conveniently steered into place. The notched plate of the caster 8 is adapted to be locked by means of a suitable bolt or rod 14 which is slidably mounted beneath one side of the framework 1 in an apertured guide lug 15 secured on the under side of one of the frame sills. The locking bolt 14 also projects through an aperture in a transverse web plate 16 forming part of the framework 1. Secured on the locking bolt 14 between the apertured guide lug 15 and the web plate 16 is a coiled spring 17 which acts to slidably project the locking bolt into locking engagement with one of the notches 13 of the rear caster plate 12. The forward or inner end of the locking bolt 14 is provided with a slot for receiving one end of the long arm 18 of a control bell crank which is pivotally mounted at 19 on the outer face of one of the chassis frame sills. Connected to the long bell crank arm 18 is a coiled control spring 20, the other end of which is secured to a screw eye or the like engaged in one of the chassis frame sills. The coiled spring 20 is stronger than the coiled spring 17 and normally acts to hold the latch bolt 14 in a retracted or released position, as shown in Figure 5. The bell crank member has a short bell crank arm 21 in the end of which a pin 22 is secured at right angles to permit said pin to project through a curved guide slot 23ª provided in one of the chassis frame sills. The control pin 22 is provided to permit the latch bolt 14 to be projected into locking engagement with one of the notches 13 of the caster 8 to hold said caster against rotation with respect to the framework 1. The control pin 22 is operable by means of a connecting bar or toggle 23, as hereinafter more fully described.

The jacking device proper is mounted upon the framework 1 on a transverse shaft 24 mounted in suitable bearing brackets 25 secured to the top rear portion of the framework 1. Pivotally mounted on the shaft 24 is a bell crank sleeve 26 having integrally formed at right angles to the middle portion thereof a short lower bell crank arm 27. Also integrally formed on the bell crank sleeve 26 on opposite sides of the intermediate or middle bell crank arm 27 are two long bell crank arms 28. Pivotally mounted on each of the long bell crank arms 28 is a grooved or recessed jack shoe 29 to one of which the upper end of the connecting bar 23 is pivotally connected. Pivotally connected to the other jack shoe 29 is one end of a connecting bar or toggle 30, the lower end of which is pivotally connected to the framework 1, as illustrated in Figure 6. The connecting toggles 23 and 30 act to hold the upper grooved portions of the jack shoes 29 in a horizontal position at all times regardless of the position of the jack bell crank mechanism. It will also be noted that the toggle bar 23 is adapted to coact with the pin 22 to control the operation of the locking bolt 14, when the bell crank arms 28 are swung downwardly from the position shown in Figure 2 to lower the jack shoes into a position to permit the same to be engaged underneath an axle of a vehicle or other device which is to be raised.

The jack bell crank mechanism is adapted to be operated by means of a screw device consisting of an internally threaded transmission sleeve or hollow shaft 31, one end of which is open and the other end of which is closed and provided with a pair of spaced lugs 32 which are pivotally connected to opposite sides of the intermediate or middle bell crank arm 27. Threaded into the internally threaded sleeve 31 is one end of a screw shaft 33 which projects upwardly at an angle and has the upper end reduced in diameter and projecting through a bearing block 34 rigidly supported on brackets 35 secured upon the top of the transverse frame plate 7. Mounted in a recess on the bearing block 34 is a thrust ball bearing 36. Integrally formed on the bearing block 34 is an upwardly projecting socket 37 in which a lever or handle 38 is adapted to be removably carried. Mounted on the upper projecting end of the screw shaft 33 is a ratchet 39 with which a double acting pawl 40 is adapted to coact. The double acting pawl 40 is mounted on one side of a crank 41 provided with a handle 42 to facilitate rotation of the crank 41 and the screw shaft 33. The upper end of the crank 41 is provided with a recess or pocket for the purpose of removably receiving one end of the lever or handle bar 38 when it is necessary to have a greater leverage for the purpose of rotating the screw shaft 33. The socket 37 is merely provided for the purpose of carrying the lever or handle bar 38 when not in use.

The operation is as follows:

The portable jack is provided with a pivoted bail 2 to permit the hooked head 4 thereof to be removably engaged to a motor truck or other device to permit the portable jack to be pulled. When the jack mechanisms mounted upon the framework 1 are to be used, the handle 42 of the crank 41 is used to turn the crank so that the pivoted pawl 40 will cause rotation of the ratchet 39, thereby causing the screw shaft 33 to be rotated to pull the internally threaded sleeve shaft 31 forwardly, thereby swinging the intermediate jack bell crank arm 27 forwardly to cause the long bell crank jack arms 28 to swing downwardly from the raised position shown in Figure 2 to cause lowering of the jack shoes 29. As the jack shoes are lowered the connecting bars or links 23 and 30 serve to maintain the upper grooved portions of the jack shoes in a horizontal position. When the jack bell crank has been lowered a predetermined amount the connecting link 23 is brought into engagement with the pin 22, thereby causing the bell crank 18—21 to be operated against the action of the spring 20, so that the long arm 18 of said bell crank acts to project the locking bolt 14 into latching engagement with one of the notches 13 of the rear caster 8. The caster 8 is thus held against rotation with respect to the jack frame 1. This arrangement permits the portable jack to be pushed in a straight line to position the lowered jack shoes 29 beneath the front axle of an automobile or other device which is to be raised. With the lowered jack shoes in position the crank 41 is rotated in an opposite direction by means of the handle 42 to cause the screw shaft 33 to be rotated upwardly in the shaft sleeve 31, thereby causing the jack bell crank to be operated to gradually raise the jack shoes 29 to cause the same to elevate the front axle of the vehicle and lift the entire front end of said vehicle off of the ground. As described, it will be noted that the front end of the vehicle is supported by the jack shoes 29 upon the portable jack mechanism so that the jacked up vehicle may be readily towed with the portable jack acting as a suitable roller support for one end of the vehicle.

In case the leverage afforded by the handle 42 on the crank 41 is insufficient to permit a heavy vehicle or other device to be elevated, the lever or handle bar 38 may be removed from the socket 37 and be engaged in the upper recessed end of the crank 41. This arrangement permits a greater leverage to be exerted upon the screw shaft mechanisms so that the bell crank device may be operated to raise heavy loads. With the raising of the jack shoes 29 the connecting link 23 is moved out of engagement with the pin 22, thereby causing the control spring 20 acting on the long bell crank arm 18 to pull the latch bolt 14 out of latching engagement with the caster 8 against the action of the coiled spring 17. It will thus be noted that when the jack mechanisms are in an elevated position that the latch bolt 14 is released to permit the caster 8 to rotate with respect to the jack frame 1 and when the jack shoes are in lowered position the latch bolt 14 serves to lock the caster 8 against rotation so that the portable jack may be conveniently pushed in a straight line underneath the device which is to be elevated.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A portable jack comprising a frame, casters supporting the same, a bell crank pivotally mounted on said frame, spaced jack shoes pivotally mounted on said bell crank, means for independently maintaining said jack shoes in horizontal position at all times, a threaded sleeve pivoted on said bell crank, a screw shaft connected with said sleeve, a thrust bearing supporting one end of said screw shaft, a ratchet connected to said screw shaft, a pawl coacting therewith, and a crank pivoted on said screw shaft for supporting said pawl and adapted to actuate the same to cause said screw shaft to raise and lower said jack shoes.

2. A portable jack comprising a portable frame, a jack mechanism mounted thereon, a screw shaft connected to operate said jack mechanism, a ratchet on said screw shaft, a hollow crank pivotally mounted on said screw shaft, a pawl pivotally mounted on said crank coacting with said ratchet to permit operation of the screw shaft to cause actuation of the jack mechanism, and a handle bar for removable engagement in said hollow crank when a greater leverage is required.

3. A portable jack comprising a portable frame, a three arm bell crank pivotally mounted on said frame, jack shoes pivotally mounted on two of said bell crank arms, means for independently holding said jack shoes in a horizontal position at all times, a threaded sleeve pivoted on the third arm of said ball crank, a screw shaft threaded into said sleeve, a thrust bearing at one end of said screw shaft, a pawl and ratchet mechanism for operating said screw shaft, a crank pivoted on one end of said screw shaft for operating said pawl and ratchet mechanism, and a handle for actuating said crank.

In testimony whereof I have hereunto subscribed my name at Chicago, Cook county, Illinois.

JOHN R. HENKLE.